United States Patent
Rao et al.

(10) Patent No.: US 8,156,547 B2
(45) Date of Patent: Apr. 10, 2012

(54) METHODS AND SYSTEMS FOR DEVICE-INDEPENDENT PORTABLE SESSION SYNCHRONIZATION

(75) Inventors: Vishnu-Kumar Shivaji Rao, Vancouver, WA (US); David C. Barton, Vancouver, WA (US); Mark Gregory Hanley, Shamania, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1030 days.

(21) Appl. No.: 12/014,707

(22) Filed: Jan. 15, 2008

(65) Prior Publication Data

US 2009/0183242 A1    Jul. 16, 2009

(51) Int. Cl.
*H04L 9/32* (2006.01)
*G06F 15/16* (2006.01)

(52) U.S. Cl. .............. 726/5; 709/227; 709/229
(58) Field of Classification Search ...... 726/5; 709/227, 709/229
See application file for complete search history.

(56) References Cited

U.S. PATENT DOCUMENTS

| | | | |
|---|---|---|---|
| 4,942,472 A | 7/1990 | Imbert et al. | |
| 5,274,448 A | 12/1993 | Lenz et al. | |
| 6,202,210 B1 | 3/2001 | Ludtke | |
| 6,292,172 B1 | 9/2001 | Makhlouf | |
| 6,756,997 B1 | 6/2004 | Ward, III et al. | |
| 6,819,364 B2 | 11/2004 | Creed et al. | |
| 7,039,698 B2 | 5/2006 | Slemmer et al. | |
| 7,114,167 B2 | 9/2006 | Slemmer et al. | |
| 7,142,230 B2 | 11/2006 | Novak et al. | |
| 2002/0065912 A1* | 5/2002 | Catchpole et al. | 709/224 |
| 2002/0149705 A1 | 10/2002 | Allen et al. | |
| 2003/0055974 A1 | 3/2003 | Brophy et al. | |
| 2003/0105805 A1 | 6/2003 | Jorgenson | |
| 2003/0220901 A1 | 11/2003 | Carr et al. | |
| 2004/0068573 A1 | 4/2004 | Corbeil | |
| 2004/0073432 A1 | 4/2004 | Stone | |
| 2004/0225716 A1* | 11/2004 | Shamir et al. | 709/204 |
| 2005/0141542 A1 | 6/2005 | Handekyn et al. | |
| 2005/0149980 A1 | 7/2005 | Yun | |
| 2005/0174488 A1 | 8/2005 | Chennakeshu | |
| 2005/0210135 A1 | 9/2005 | Abrahams et al. | |
| 2005/0261985 A1 | 11/2005 | Miller et al. | |
| 2006/0078072 A1 | 4/2006 | Cheon et al. | |
| 2006/0184681 A1 | 8/2006 | Bernardi et al. | |
| 2007/0156805 A1 | 7/2007 | Bristol et al. | |

FOREIGN PATENT DOCUMENTS

| | | |
|---|---|---|
| EP | 1517259 A1 | 3/2005 |
| WO | WO01/33858 A1 | 5/2001 |
| WO | WO03/044684 A1 | 5/2003 |
| WO | WO2005/059767 A1 | 6/2005 |

OTHER PUBLICATIONS

Craig Partridge, et al. FIRE: Flexible Intra-AS Routing Environment. Oct. 2000. ACM SIGCOMM Computer Communication Review. vol. 30 Issue 4. pp. 1-13.*

* cited by examiner

*Primary Examiner* — Kambiz Zand
*Assistant Examiner* — Aubrey Wyszynski
(74) *Attorney, Agent, or Firm* — Kristine Elizabeth Matthews; David C. Ripma

(57) ABSTRACT

Aspects of the present invention relate to systems and methods for device-independent portable session synchronization between multiple devices connected to a server system. Some aspects relate to the use of a real-time-request (RTR) database construct for managing communication between devices. Some aspects relate to management logic, which manages entries in the RTR database construct. In some aspects, database construct entries relate to device identification, session identification, device requests and device responses.

20 Claims, 17 Drawing Sheets

METHODS AND SYSTEMS FOR DEVICE-INDEPENDENT PORTABLE SESSION SYNCHRONIZATION

RELATED REFERENCES

U.S. patent application Ser. No. 11/367,939, entitled "Methods and Systems for Configuring Media-Playing Sets," filed on Mar. 3, 2006; U.S. patent application Ser. No. 11/367,937, entitled "Methods and Systems for Configuring Media-Playing Sets," filed on Mar. 3, 2006; and U.S. patent application Ser. No. 11/838,188, entitled "Methods and Systems for Multiple-Device Session Synchronization," filed on Aug. 13, 2007, are hereby incorporated herein by reference.

FIELD OF THE INVENTION

Embodiments of the present invention comprise methods and systems for device-independent portable session synchronization between multiple devices connected to a server system.

BACKGROUND

As increasing numbers of electronic devices may be capable of inter-connection and of connection to computer, and other, networks, there becomes a need for device-independent, portable, session synchronization.

SUMMARY

Some embodiments of the present invention comprise methods and systems for multiple-device session synchronization comprising a stateless system using a real-time-request database construct and real-time-request management logic.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
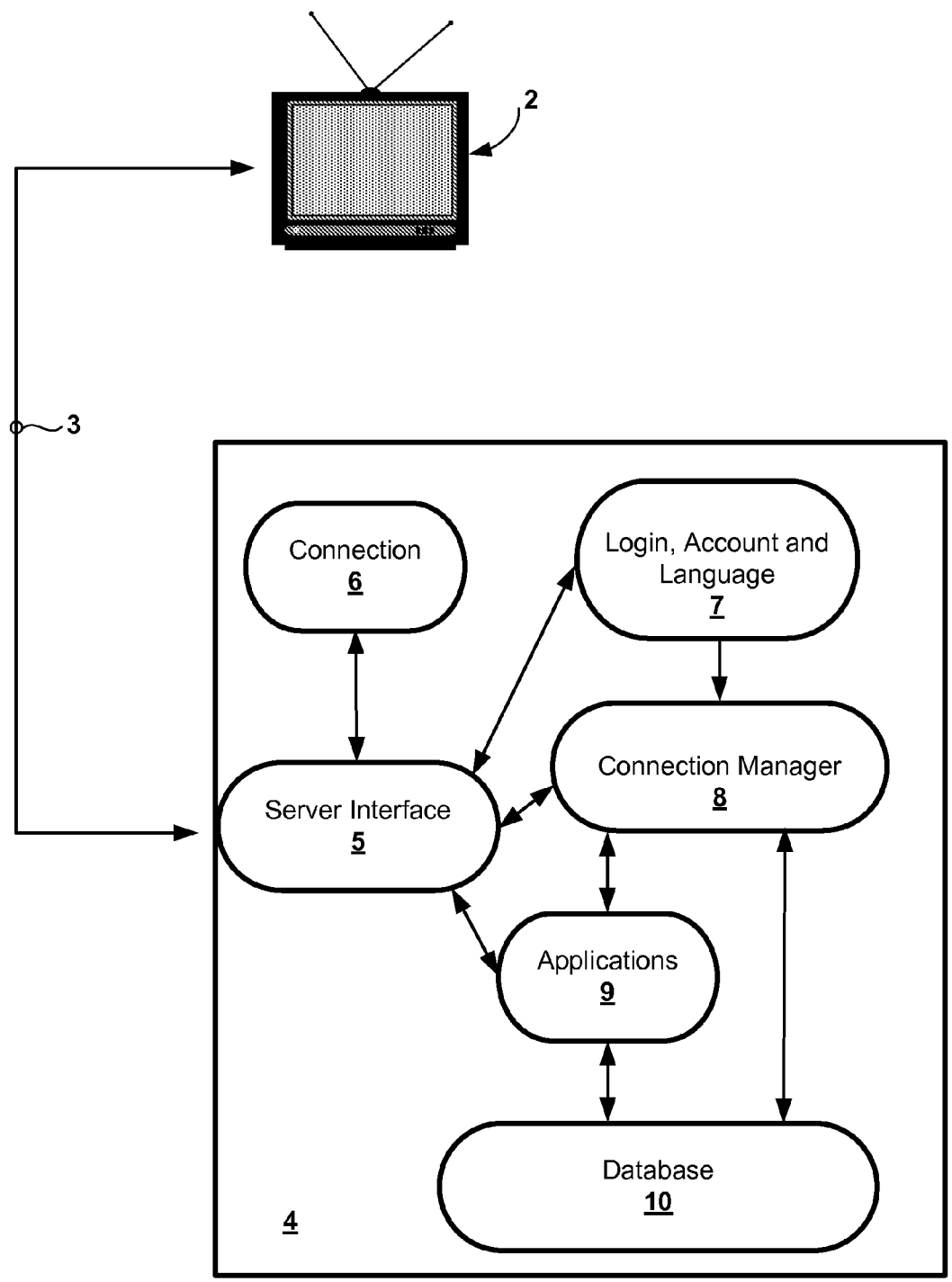
FIG. 1 is a drawing showing embodiments of the present invention comprising a server system and an electronic device.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Many electronic devices may connect to computer, and other, networks and may offer connected features, for example, Instant Messaging (IM), electronic mail (email) and web browsing. A connected feature may be a proprietary feature unique to a device, or a connected feature of a device may emulate a connected feature of another device. Many connected features may offer user experiences that persist only on a session basis within a device. There has been considerable progress in making content available to many kinds of devices through the standardization of sound formats and transport mechanisms, video formats and transport mechanisms, email formats and transport mechanisms and other standardization efforts. However, there exists a standard method for providing device-independent, autonomous features with user sessions that may be portable between devices. Some embodiments of the present invention comprise methods and systems for device-independent, autonomous user session portability.

Some embodiments of the present invention comprise methods and systems for inter-connection of electronic devices. Exemplary electronic devices may comprise media-playing devices (e.g., a television or a handheld DVD (Digital Versatile Disc, sometimes referred to as Digital Video Disc) player), computing devices (e.g., a personal computer), communication devices (e.g., a cellular telephone), imaging devices (e.g., a digital camera or a video camera) and other electronic devices (e.g., a PDA (Personal Digital Assistant) or a game device). An electronic device may belong to several of the exemplary categories enumerated above. For example, some communication devices, such as some cellular telephones, may also be considered media-play devices and imaging devices.

In some embodiments of the present invention, an electronic device, also considered a client device, may be connected through a remote server at a customer support center to a customer-support computing device. In some embodiments the customer-support computing device may be associated with a customer service representative. In alternative embodiments of the present invention, a first electronic device may be connected through a remote server to a second electronic device. In some embodiments, both the first electronic device and the second electronic device may be under the control of a single user. In alternative embodiments, the first electronic device may be under the control of a first user, and the second electronic device may be under the control of a second user.

In some embodiments of the present invention, a client device may comprise a display, a user input device (e.g., a keyboard, a mouse or a remote control), network connectivity and software. Exemplary client-device software may comprise a network TCP/IP (Transmission Control Protocol/Internet Protocol) stack, a network SSL (Secure Sockets Layer) software stack, network-connectivity client software (e.g., an HTTP (HyperText Transfer Protocol) client) and other software.

In some embodiments of the present invention, a server system may comprise a processor, a storage device, network connectivity and software. In alternative embodiments, a server system may further comprise a display. Exemplary server software may comprise server management tools, a network TCP/IP stack, a network SSL software stack, network-connectivity server software (e.g., Apache HTTP server), an FTP (File Transfer Protocol) server, a mail server and other software.

Some embodiments of the present invention may be described in relation to FIG. 1. An electronic device 2 may be communicatively coupled 3 to a server system 4. The server system 4 may comprise a server interface 5 through which a connection component 6 may manage the initial process of connecting the electronic device 2 and the server system 4 software. The server system 4 may further comprise a login, account and language (LAL) component 7, a customer-connection-page manager 8, a plurality of applications 9 and a database 10. In some embodiments of the present invention, the above-enumerated components may reside on a single server device. In alternative embodiments, portions of the server system 4 may reside on multiple server devices (e.g., a communication server, an application server and other servers).

The connection component 6 may manage authentication and encryption portions of the communication between the electronic device, also considered the client, 2 and the server system 4. In some embodiments of the present invention, the connection component 6 may be based on an SSL protocol.

Figure 2:
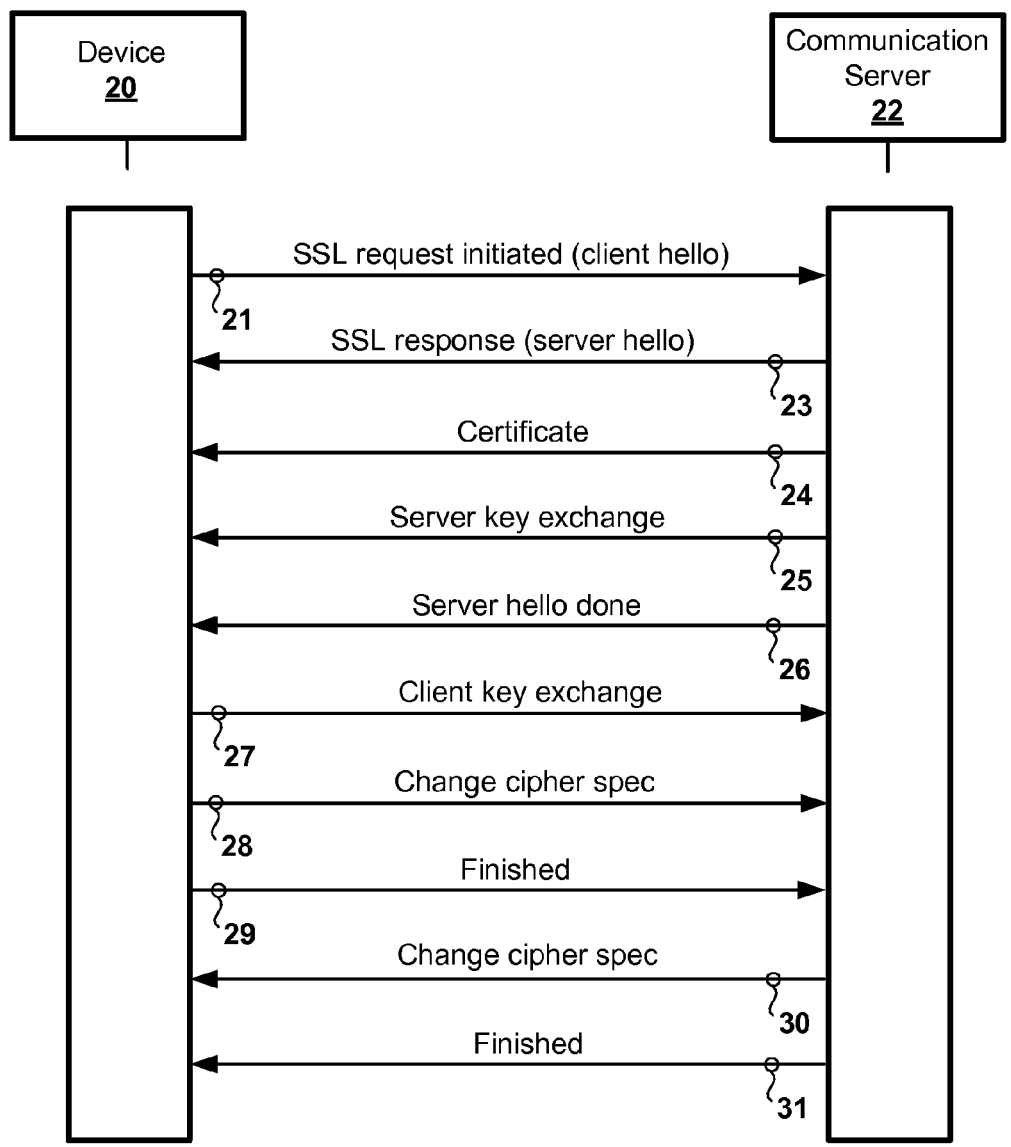
FIG. 2 is a chart showing an exemplary SSL handshake protocol.

An exemplary SSL handshake protocol may be described in relation to FIG. 2. An electronic device 20 may send an SSL request ("ClientHello") 21 to a server 22 to initiate the negotiation of SSL session characteristics. The server authentication and key exchange may then occur. The server 22 may respond 23 to the device-initiated "ClientHello" message with a "ServerHello." Next the server 22 may send its certificate, and associated certificate chain, 24 to the electronic device 20. The server 22 may then send a public key 25 followed by an end message 26. The client key exchange 27 may then occur from the electronic device 20 to the server 22. The electronic device 20 may tell 28 the server 22 to change cipher and the server 22 may respond 30 with its own changed cipher message. Finished messages 29, 31 may be hashes for verification.

Figure 3:
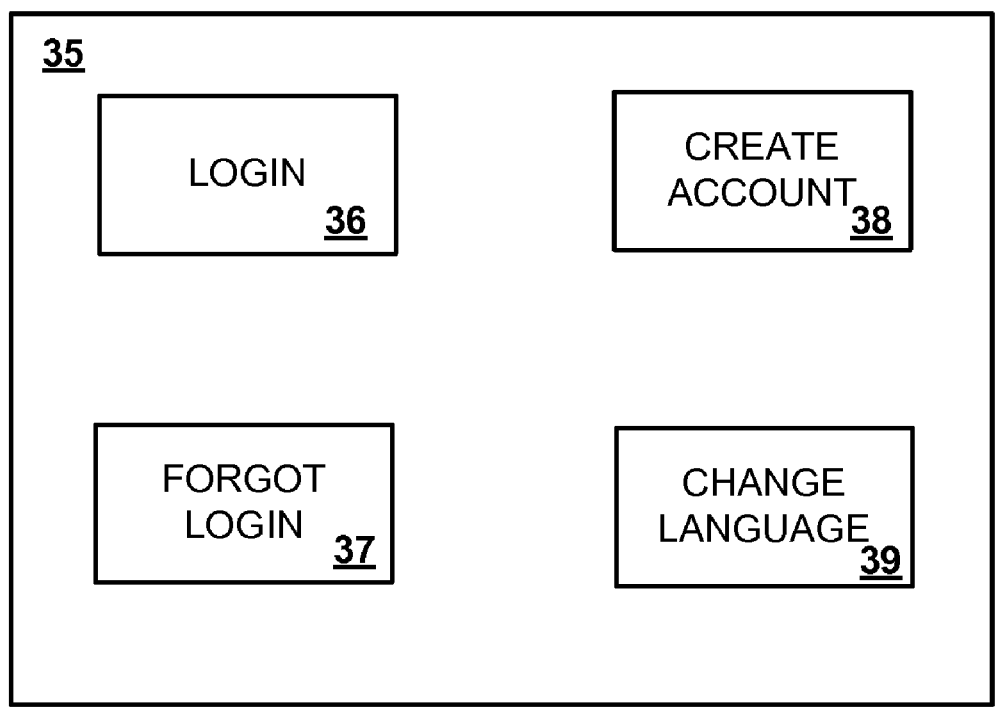
FIG. 3 is a drawing showing an exemplary options display.

In some embodiments of the present invention, the LAL component 7 may be responsible for presenting and handling the login process for valid clients, creating valid client accounts on the server 4, retrieving valid client account information, deleting client account information from the server 4 and creating, on the server 4, a language preference for connected clients. Login, account and language options may be presented via a graphical user interface (GUI) on the electronic device 2. FIG. 3 depicts an exemplary options display 35 on an exemplary electronic device with four options 36, 37, 38, 39. Upon receiving a selection through the GUI, the electronic device 2 may transmit the selection to the server 4.

Figure 4:
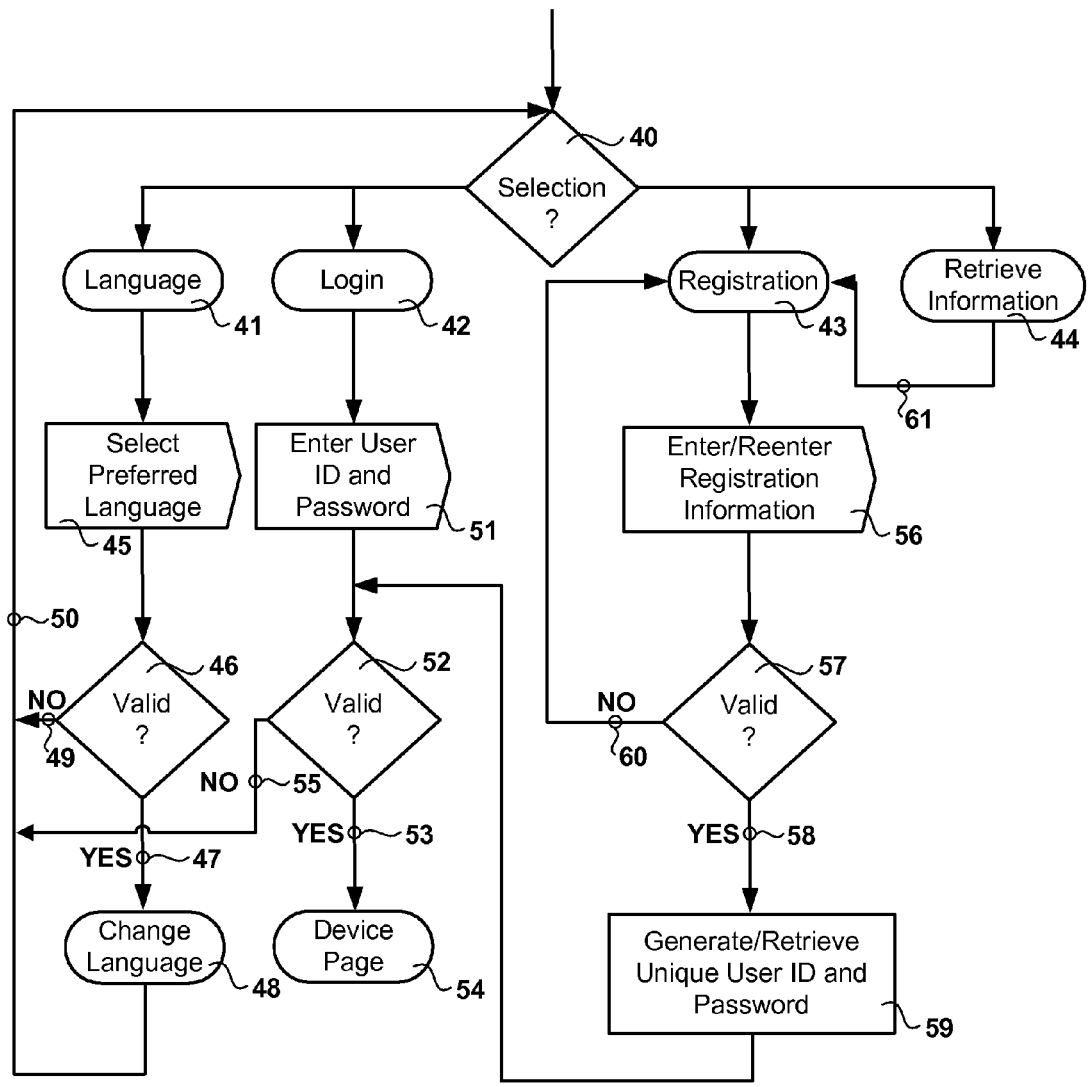
FIG. 4 is a chart showing embodiments of the present invention comprising an exemplary embodiment of a login, account and language (LAL) component.

An exemplary embodiment of the LAL component 7 may be described in relation to FIG. 4. The LAL component 7 may receive a selection 40 sent from the electronic device 2 to the server 4. In some embodiments of the present invention, the selection may be related to one of the following options: "language" option 41, "login" option 42, "registration" option 43, and "retrieve information" option 44. The options may correspond to the options displayed at the electronic device GUI.

If the "language" option 41 is received, then the LAL component 7 may request 45 a preferred language selection from the electronic device. Upon receipt of the preferred language selection, the LAL component 7 may determine 46 if the preferred language selection is a valid selection. If the preferred language selection is a valid selection 47, then the LAL component 7 may change 48 the language setting and then may request 50 a new selection. If the preferred language selection is not a valid selection 49, then the LAL component 7 may request 50 a new selection.

If the "login" option 42 is received, then the LAL component 7 may request 51 login information from the electronic device. Exemplary login information may comprise a user identification (ID), a password and other login information. Upon receipt of the login information, the LAL component 7 may determine 52 if the login information is valid. If the login information is valid 53, then the LAL component 7 may transfer control 54 to the connection manager 8. If the login information is not valid 55, then the LAL component 7 may request 50 a new selection.

If the "registration" option 43 is received, then the LAL component 7 may request 56 registration information. Exemplary registration information may comprise electronic device model, serial number, device owner telephone number, device location zip code and other product or product owner information. Upon receipt of the registration information, the LAL component 7 may determine 57 if the registration information is valid. If the registration information is valid 58, then the LAL component 7 may generate unique login information 59 and determine 52 if the login information is valid. If the registration information is not valid 60, the LAL component 7 may return to the "registration" option 43 selection in order to request registration information again.

If the "retrieve information" option 44 is selected, then the LAL component 7 may redirect 61 to the "registration" option 43. This may allow login information to be retrieved 59 after re-entry of valid registration information.

In some embodiments of the present invention, the connection manager component 8 may be responsible to access and interpret a customer profile. The connection manager component 8 may populate a customer connection page with required support information and features. The connection manager component 8 may also maintain the customer account information page and initiate any valid support or feature selected by a user at the electronic device 2.

Figure 5:
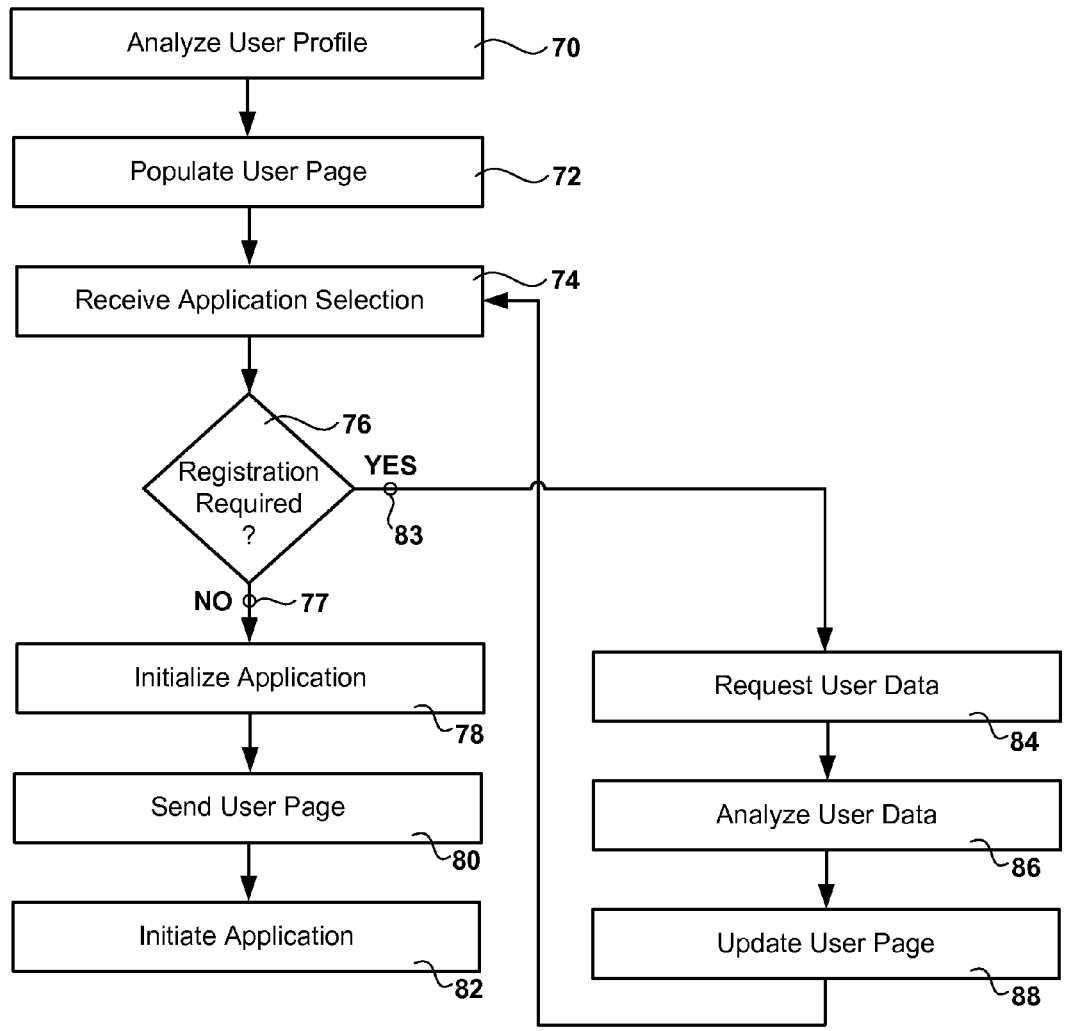
FIG. 5 is chart showing embodiments of the present invention comprising an exemplary embodiment of a connection manager component.

An exemplary embodiment of a connection manager component 8 may be described in relation to FIG. 5. After analyzing 70 a user profile, the connection manager component 8 may populate 72 a user page. The user page may be populated with user data obtained from a database 10. Then upon receipt of an application 9 selection 74 from the electronic device 2, the connection manager component 8 may determine 76 if application-specific registration is required. If application-specific registration is not required 77, then the selected application may be initialized, the user page presented 80 and the selected application initiated 82. If application-specific registration is required 83, then the connection manager component 8 may request 84 user data from the user or the database 10, analyze 86 the user data and update 88 the user page.

Exemplary applications may comprise device remote-control help, device menu control help, device product manual, device customer agent driver frequently asked question (FAQ) help, device-to-device message transfer, user-to-user message transfer and other applications. In some embodiments of the present invention, applications follow a model-view-controller structure.

Figure 6:
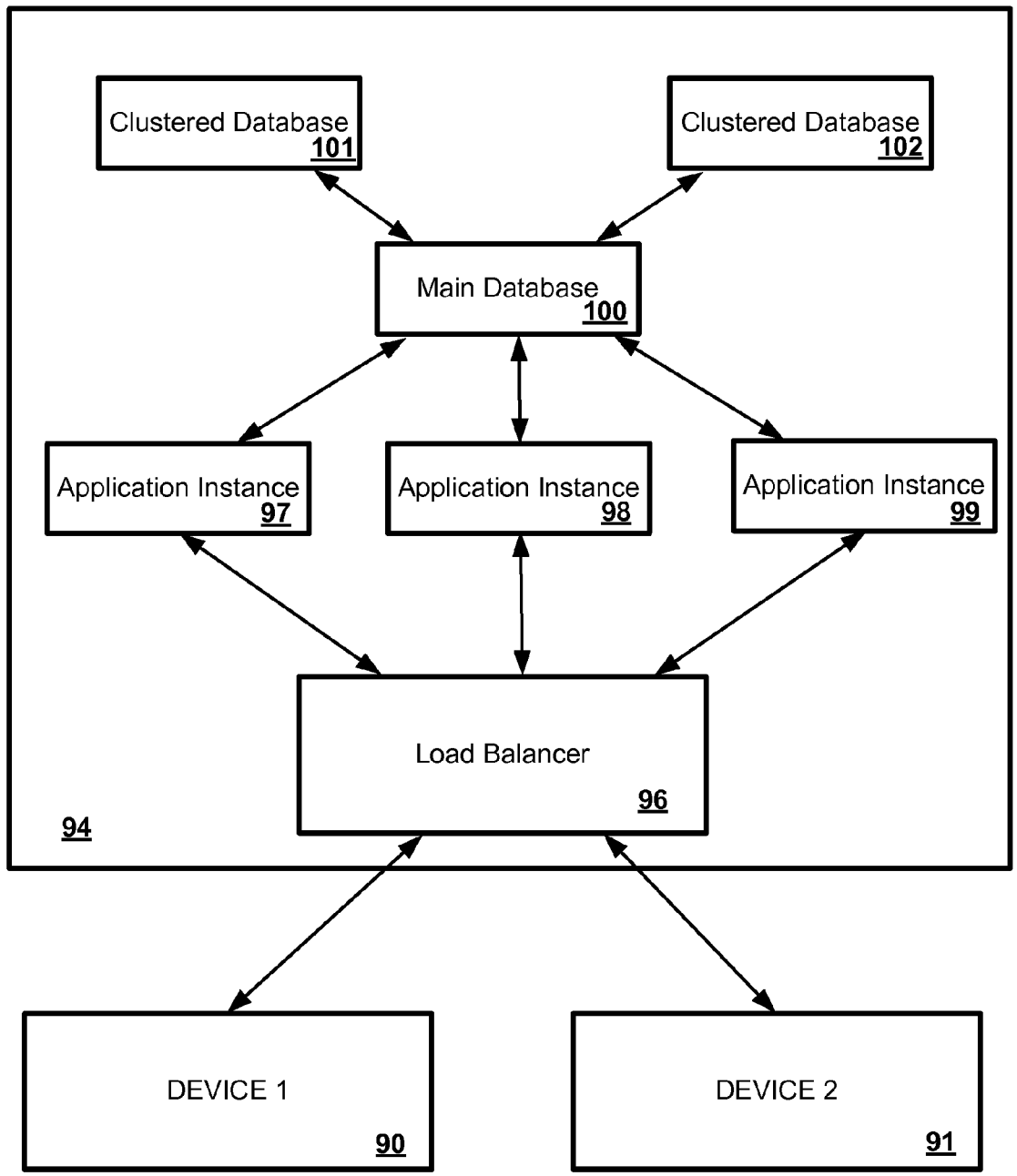
FIG. 6 is a drawing showing embodiments of the present invention comprising a server system and electronic devices.

In some embodiments of the present invention described in relation to FIG. 6, a first electronic device 90 may connect to a second electronic device 92 through a server system 94 which may comprise a load balancer 96, multiple application instances (three shown) 97, 98, 99 which may reside on multiple central processing units (CPUs), a main database 100 and multiple clustered databases (two shown) 101, 102. In some embodiments, communication between an electronic device 90, 91 and the server system 94 may comprise HTTP-XML (extensible Markup Language). The main database 100 and/or a database in the clustered databases 101, 102 may record every transaction between the first electronic device 90 and the second electronic device 92. The transactions may be linked together by the request parameters. In some embodiments of the present invention, the second electronic device 92 may be associated with a customer service representative. In alternative embodiments of the present invention, the second electronic device 92 may be associated with the owner of the first electronic device 90. In yet alternative embodiments of the present invention, the second electronic device 92 may be associated with a second owner.

Figure 7:
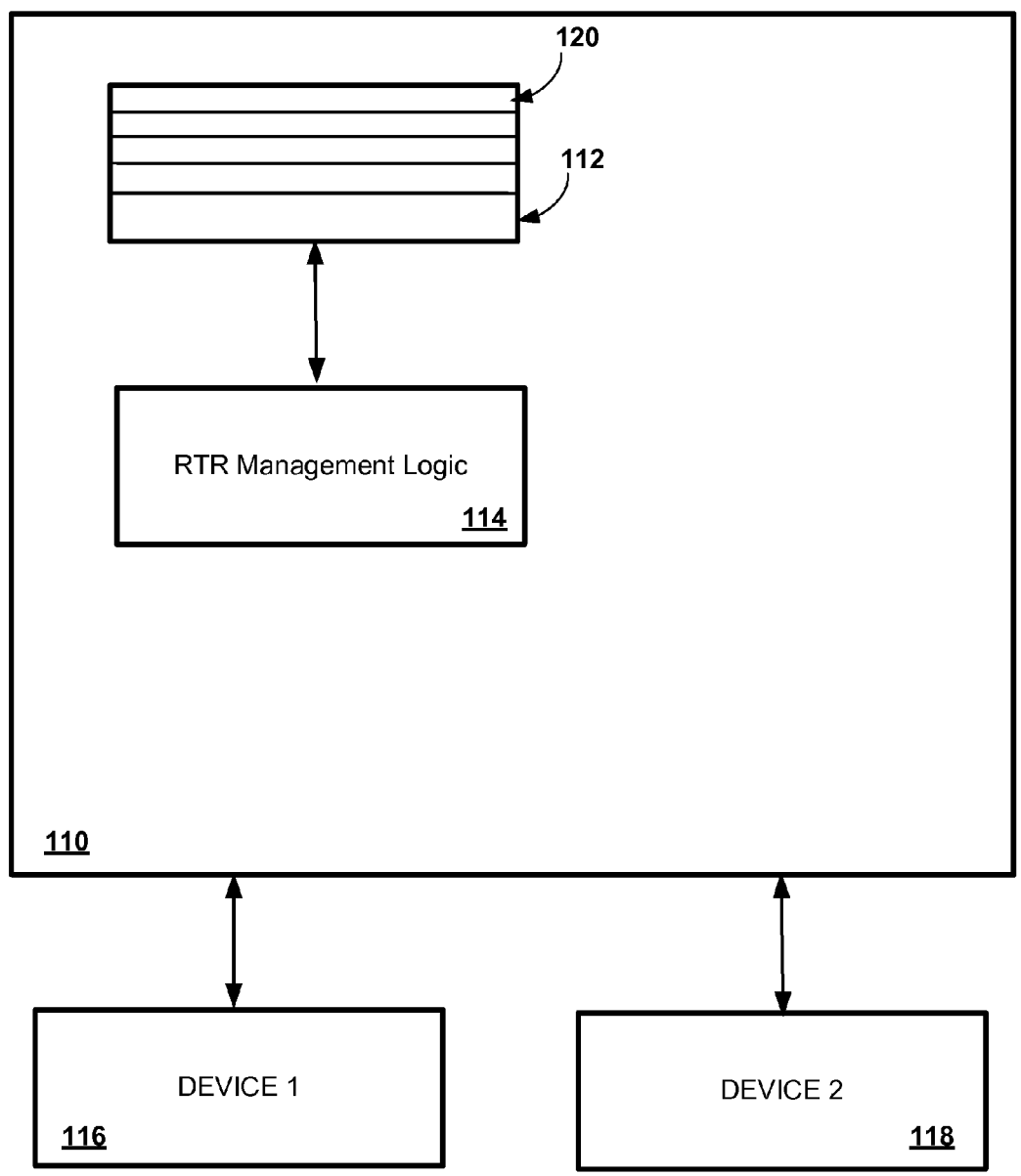
FIG. 7 is drawing showing embodiments of the present invention comprising a real-time-request database construct.

In some embodiments of the present invention described in relation to FIG. 7, a server system 110 may comprise, for recording and linking transactions, a real-time-request (RTR) database construct 112, for example a table, array or other database structure, and RTR management logic 114. The RTR management logic 114 may be embodied in software, hardware, firmware or a combination of such. Transactions between a first client device 116 and a second client device 118 may be handled through the server system 110 by the RTR management logic 114. An RTR database construct 112 may comprise a linked list of database entries, wherein each entry may represent a step in a storyline for a client device, 116, 118. An RTR database entry 120 may comprise generic data fields and other utility fields to accommodate single and multiple client storylines that may be step-synchronized between clients. The generic data fields may provide two-way communication between step-synchronized clients. In some embodiments, these fields may serve as semaphores for HTTP communication by communicating to client threads within an application instance. The communication may instruct a client thread to create, delay or otherwise process an HTTP response in relation to the actions of another client.

In some embodiments of the present invention, credentials may be included in every HTTP request. Exemplary credential may include username, password, client type and other credentials. In some embodiments, the credentials may be included as URL (Universal Resource Locator) parameters. In some embodiments of the present invention, a unique client-storyline identifier may be provided in each request which may be used the RTR management logic 114 to associate client requests with the appropriate multi-client storyline.

In some embodiments of the present invention, an RTR database entry 120 may not comprise a branch and may contain a single reference to a parent RTR database entry 120. Simultaneous features for a client device may be accommodated by simultaneous and separate storylines and RTR threads. An RTR database entry 120 may be a storyline step and may be used by any client device that may accommodate a single or multi-user storyline.

Figure 8:
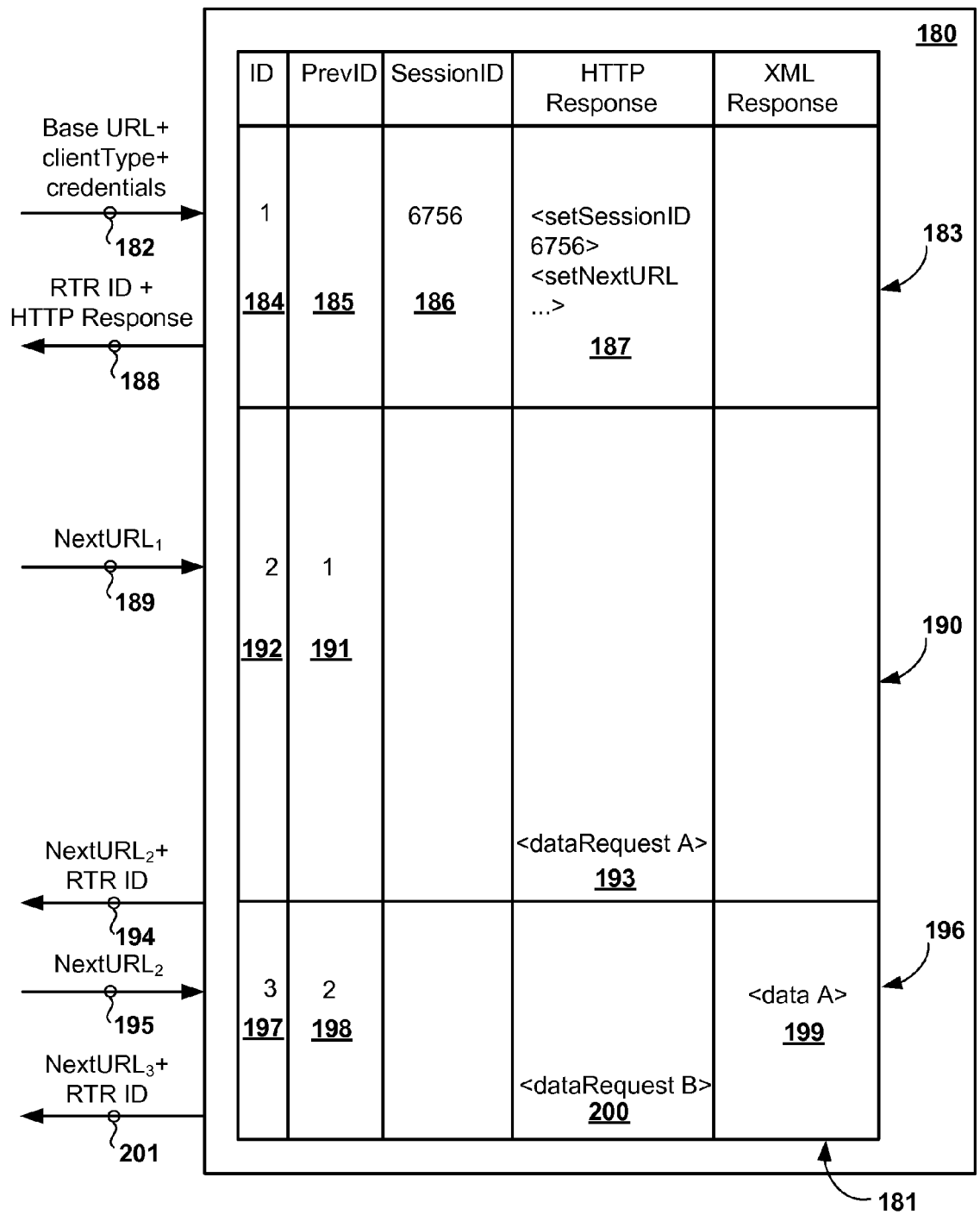
FIG. 8 is a drawing showing an exemplary transaction between a server system and an electronic device.

An exemplary transaction between a first client device and a server system may be described in relation to FIG. 8. In some embodiments of the present invention, a first client device may make a first request 182 to a server system 180 using a base location identifier associated with the server system 180. In some embodiments of the present invention, the base location identifier may comprise a URL, as shown in the exemplary transaction of FIG. 8. The client credentials and the client type for the first client device may be included in the parameters of the request 182. An entry 183 corresponding to the request 182 may be made in an RTR database construct 181 by RTR management logic. The entry 183 may comprise an RTR entry identifier (ID) 184, a previous RTR entry identifier (PrevID) 185, a session identifier (SessionID) 186 and other fields. In some embodiments of the present invention, the previous RTR entry identifier, PrevID, 185 may be null for the initial entry in the RTR database construct 181.

The RTR management logic may wait for an HTTP response field entry 187 corresponding to the first entry 183 to appear. In some embodiments, the wait may be effectuated by periodic polling, for example, polling every 0.5 seconds.

In some embodiments, for an initial call to the server system 180, the URL may not specify a class or a method, and the "DirectAction" class and the "DefaultAction" may be used by default. The "DirectAction" class may be loaded. "PerformActionNamed" may be executed, which may call "ValidDevice" in order to authenticate the request 182 with the first client device credentials received as parameters in the HTTP request 182. A "ValidDevice" object may be returned with a reference to the newly created RTR database construct 181. "DefaultAction" may then be called, which may create a "DeviceLoggedIn" object, which may return an XML response setting the session identifier, sessionID, and next URL (nextURL). The next URL, nextURL, may be computed by the "RealTimeRequest" class based on the previous RTR identifier, PrevID, 185 and the type of transaction. In some embodiments of the present invention, the RTR management logic may create a different URL for a transaction which may not wait for a client response and a transaction which may wait for a client response.

The server system 180, through the RTR management logic, may assign the session identifier, SessionID, 186 and may populate the HTTP Response field 187 in the RTR database construct 181 with an XML command to set the session identifier, sessionID, 186 and the next URL, nextURL$_1$. In some embodiments, the next URL, nextURL$_1$, may comprise a reference to the RTR entry identifier, ID, 184. The RTR management logic may detect the HTTP response 187 in the RTR database construct 181, and may copy the response 187 into the body of an HTTP response and may send 188 the response to the first client device.

The first client device may record the session identifier locally, for example in a graphical user interface or other location, and the first client device may then call 189 the next URL, nextURL$_1$. The next URL, nextURL$_1$, may contain a reference to the previously created RTR entry 183. The RTR management logic may create a new RTR entry 190 which may be linked to the previous RTR entry 183. In some embodiments, the linking may be effectuated by setting the previous RTR identifier, PrevID, field 191 to that value which identifies the previous RTR entry 184. A new RTR identifier 192 may be assigned.

A first data request to the client device may be made through the RTR database construct 181 by populating the HTTP Response portion 193 of the RTR database construct 181. The RTR management logic may detect the response 193 in the RTR database construct 181, and may send 194, in an XML command in the body of the HTTP response, the data request and a next URL, nextURL$_2$, to the first client device. The next URL, nextURL$_2$, may be encoded for the RTR thread. The first client device may call 195 the next URL, nextURL$_2$, with the requested data in the body of the request.

The next URL, nextURL$_2$, may contain a reference to the previously created RTR entry 190. The RTR management logic may create a new RTR entry 196 which may be linked to the previous RTR entry 190. In some embodiments, the linking may be effectuated by setting the previous RTR identifier, PrevID, field 198 in the new entry 196 to that value which identifies the previous RTR entry 192. A new RTR identifier 197 may be assigned. The RTR management logic may detect the data in the body of the request and may populate the XML response portion 199 of the RTR entry 196. A second data request may be made through the RTR database construct 181 by populating the HTTP Response portion 200 of the RTR database construct 181. The RTR management logic may detect the response 200 in the RTR database construct 181, and may send 201, in an XML command in the body of the HTTP response, the data request and a next URL, nextURL$_3$, to the first client device. The next URL, nextURL$_3$, may be encoded for the RTR thread.

In some embodiments of the present invention, the URLs, URL, URL$_1$, URL$_2$ and URL$_3$ may be distinct. In alternative embodiments of the present invention, the URLs may not be distinct.

Figure 9:
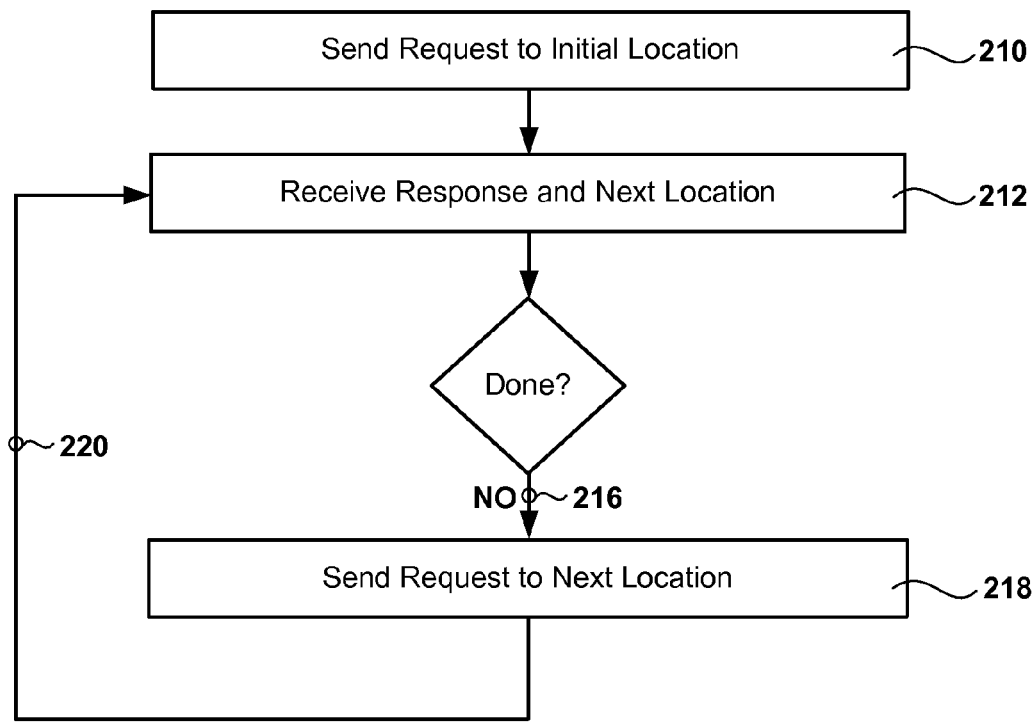
FIG. 9 is chart showing embodiments of the present invention comprising a an electronic device wherein the location for requests from the electronic device may be transmitted from the server system to the electronic device.

Some embodiments of the present invention may be described in relation to FIG. 9. A client device may send 210 a request to an initial location, for example the URL of a server or server system. The client device may receive 212 a response to the request and a next location to which the next request from the client may be sent. If the client device has not completed 216 the interaction with the server system, then the client device may send 218 the next request to the next location that was received 212 in the response from the from the server system. The request/response cycle may continue 220. In some embodiments of the present invention, the response from the server system received 212 at the client device may comprise a data request, instructions for the client device or other information in addition to the next location information. The request sent 218 from the client device to the server system may comprise data in addition to a request.

Figure 10:
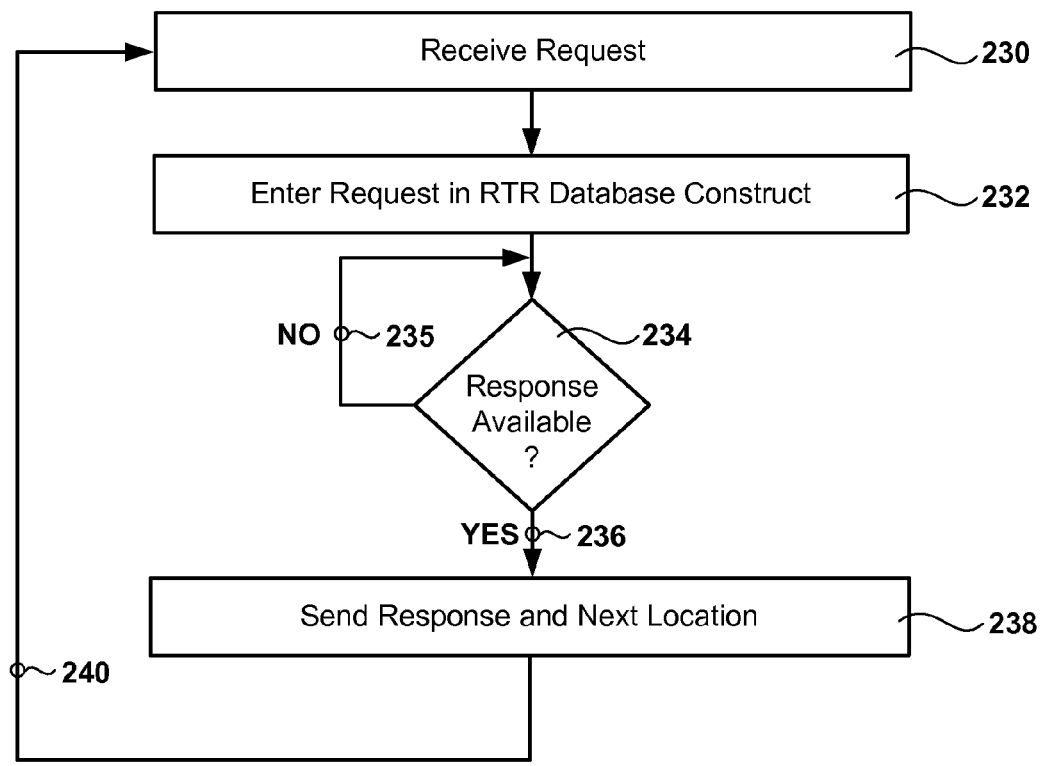
FIG. 10 is a chart showing embodiments of the present invention comprising a server system wherein the location for requests from an electronic device may be transmitted form the server system to the electronic device.

Some embodiments of the present invention may be described in relation to FIG. 10. A server system may receive 230 a request from a client device. The server system may enter 232 the request in an RTR database construct. The server system may determine 234 if a response to the request is available. If a response is not available 235, the server system may wait for a response to become available. When a response is available 236, the server system may send 238 the response and the location for a next request to the client device. The server system may then receive additional requests from the client device, continuing 240 the request/response cycle. When a request is entered 232 into the RTR database construct, the entry may be linked to previous entries in the thread or storyline. The response sent 238 to the client device may comprise instructions for the client device, a data request or other information.

Figure 11:
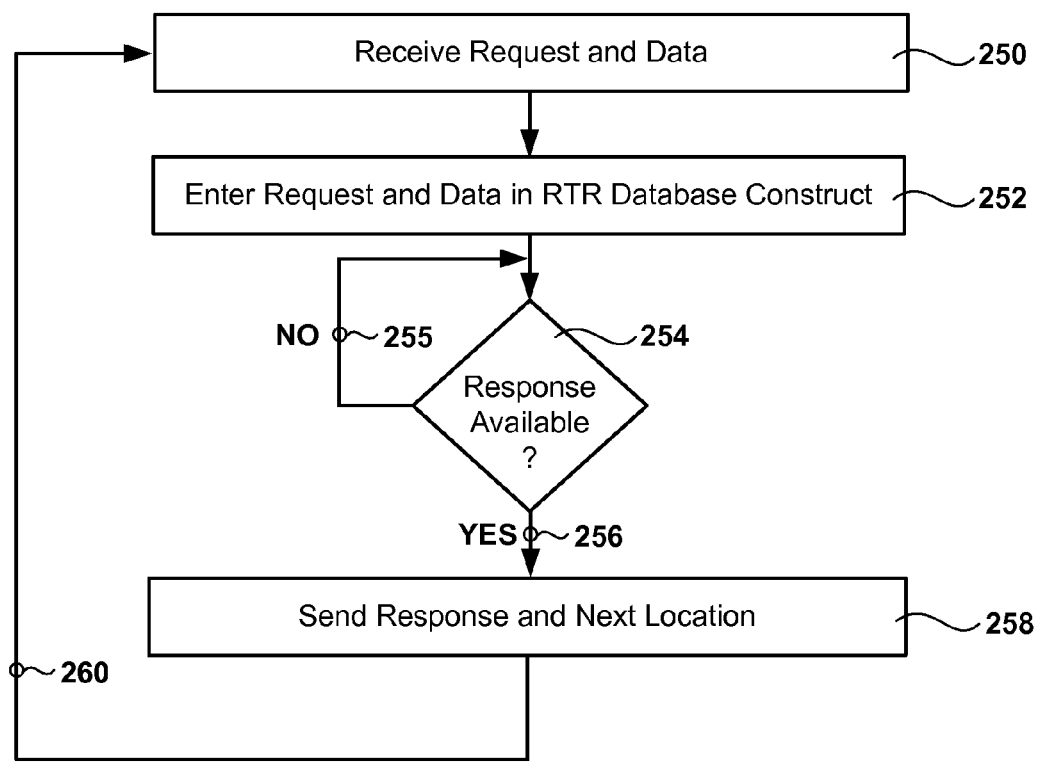
FIG. 11 is chart showing embodiments of the present invention comprising a server system wherein a data request may be sent in a response to an electronic device.

Some embodiments of the present invention may be described in relation to FIG. 11. A server system may receive 250 a request and data from a client device. The server system may enter 252 the request and the data in an RTR database construct. The server system may determine 254 if a response to the request is available. If a response is not available 255, the server system may wait for a response to become available. When a response is available 256, the server system may send 258 the response and the location for a next request to the client device. The server system may then receive additional requests and data from the client device, continuing 260 the request/response cycle. When a request and data are entered 252 into the RTR database construct, the entry may be linked to previous entries in the thread or storyline. The response sent 258 to the client device may comprise instructions for the client device, a data request or other information.

Figure 12:
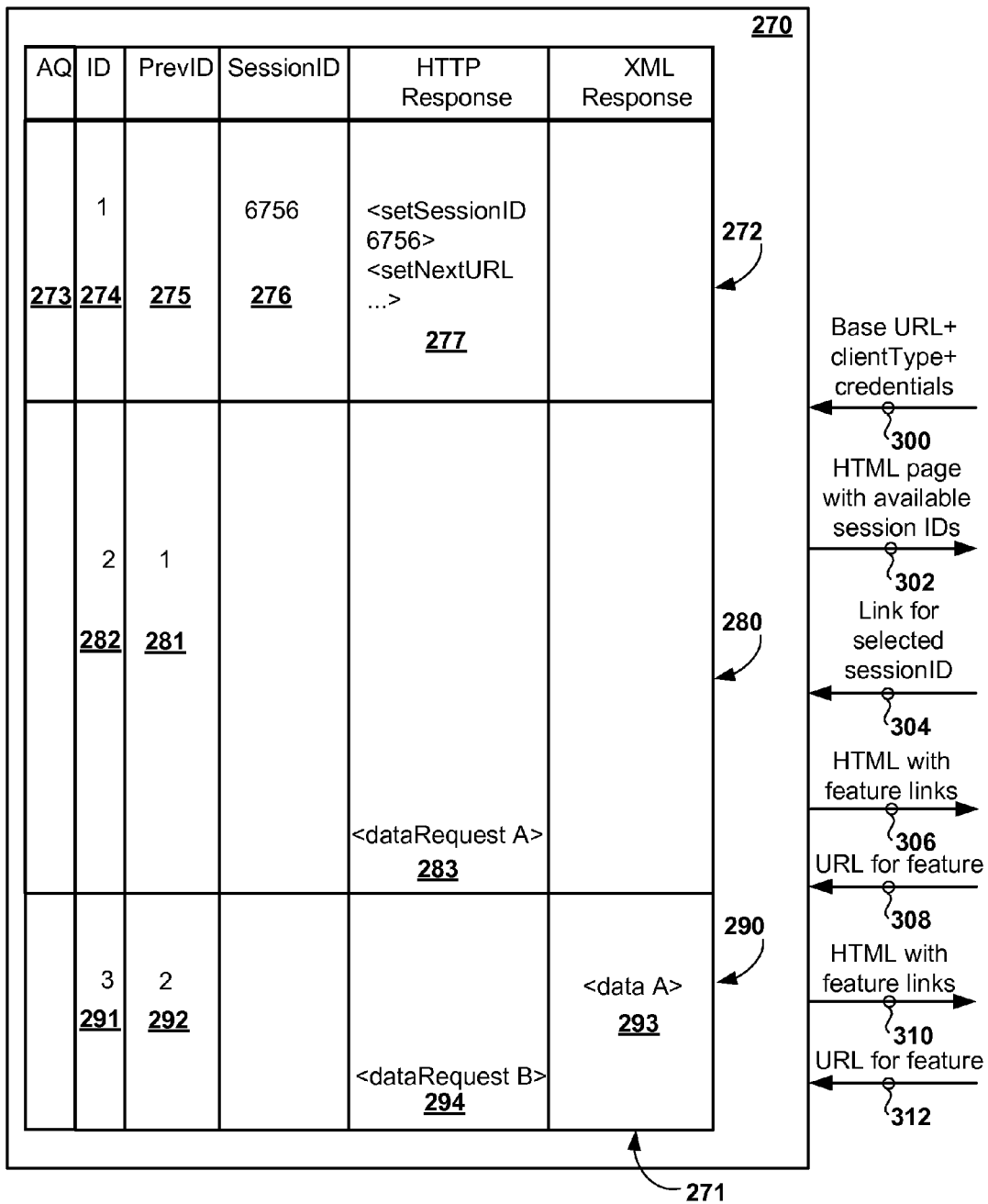
FIG. 12 is a drawing showing an exemplary transaction between a server system and an electronic device.

An exemplary transaction between a first client device and a server system may be described in relation to FIG. 12. In some embodiments of the present invention, a first client device may make a first request 300 to a server system 270 using a base location identifier associated with the server system 270. In some embodiments of the present invention, the base location identifier may comprise a URL. The client credentials and the client type for the first client device may be included in the parameters of the request 300. In some embodiments of the present invention, a runtime parameter may direct the server system 270 to present a login page to the first client device. In alternative embodiments, a runtime parameter may automatically log in any user to an associated user in the database. Based on the client type included as a parameter with the request 300, a default action may be called. In this exemplary transaction, the default action may effectuate the determination of a session identifier (SessionID) 276 for a session related to an available device for which there may be an RTR database construct 271 entry 272 which may indicate that the device is waiting for an HTTP response of which the first client device may provide. In some embodiments, several session identifiers each associated with a client device may be determined. The available session identifiers may be communicated 302 to the first client device from the server system 270. In some embodiments of the present invention, the available session identifiers may be communicated 302 in an HTML page.

A session identifier selected at the first client device may be submitted 304 to the server system. The RTR management logic associated with the RTR database construct 271 associated with the selected session identifier 276 may mark the RTR database construct as acquired (AQ) 273. A URL may be encoded as an "onchange" javascript command with the selected session identifier encoded in the URL. The URL may specify the "DirectAction" class and method to execute. In some embodiments the first client device credentials may be authenticated prior to calling the specified method. A top level graphical user interface for the identified storyline may be sent 306 to the first client device. A link for a feature may specify whether or not the feature requires communication from the device associated with the RTR database construct 271. If communication from the device associated with the RTR database construct 271 is not required, the feature may not effectuate a new RTR database construct 271 entry, and the device associated with the RTR database construct 271 may be unaware of the transaction. The first client device may submit 308 a URL that may specify a "DirectAction" class and method for a feature. The server system may load the class and call the specified action. In some embodiments of the present invention, the first client device credentials may be validated in each such call. If the feature requires information from the device associated with the RTR database construct 271, then the HTTP Response portion 283 of the RTR database construct entry 280 may be populated with the request. The information required may be specified by a special key in the URL.

The RTR management logic may determine the populated field and send the response and the next URL to the device associated with the RTR database construct 271. The requested data 293 may be entered in RTR database construct 271 upon receipt by the client device associated with the RTR database construct 271 and sent 310 to the first client device. The first client device may use the data and request additional data by submitting 312 another URL for a feature and request for information.

Figure 13:
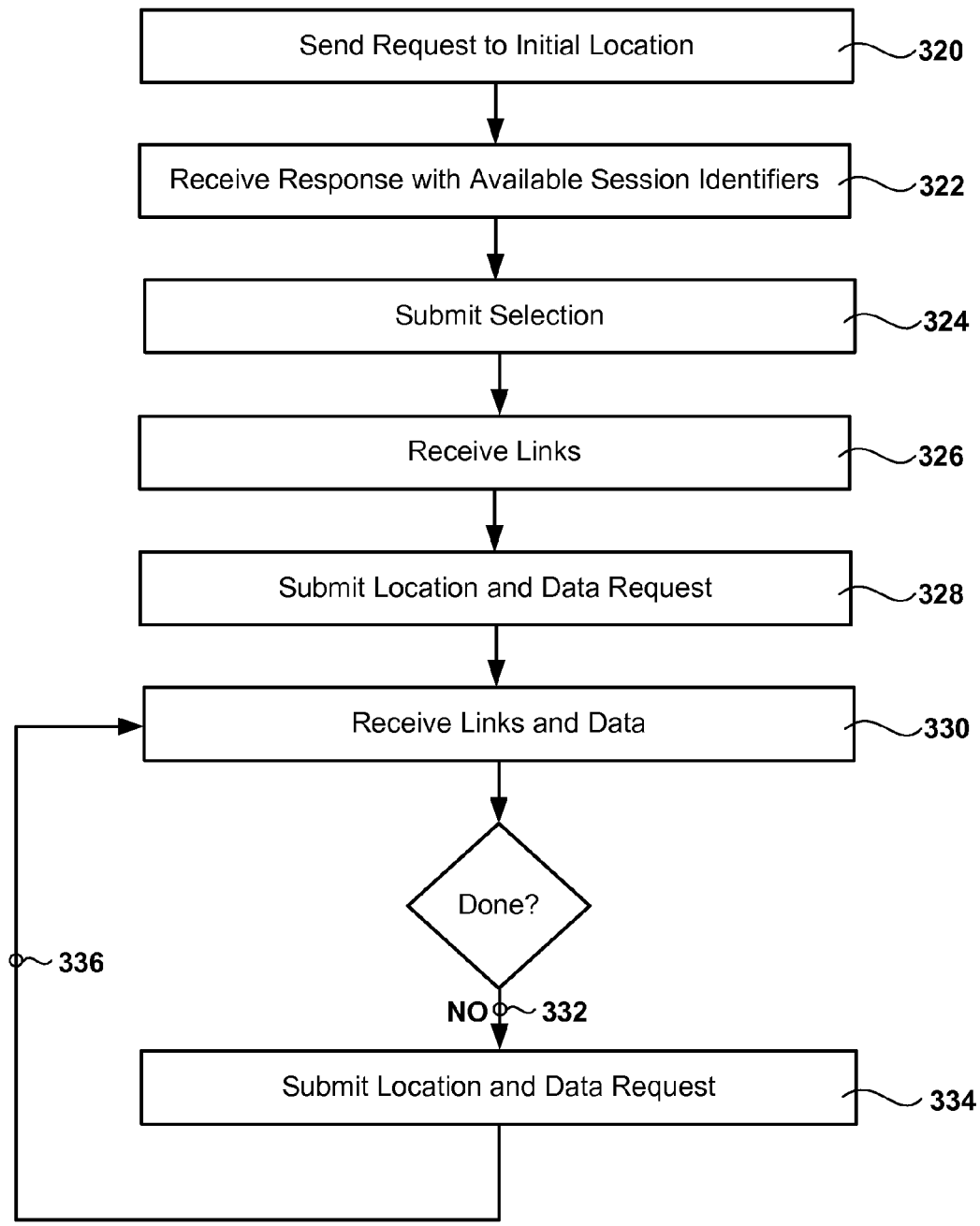
FIG. 13 is a chart showing embodiments of the present invention comprising a transaction between a server system and an electronic device.

Some embodiments of the present invention may be described in relation to FIG. 13. A client device may send 320 a request to an initial location. In some embodiments of the present invention, the initial location may be related to a server system, and the initial location may comprise a base URL associated with the server system. In some embodiments of the present invention, the client credentials and the client type for the first client device may be included in the parameters of the request The client device may receive 322 a response for the server system. The received response may comprise a list of available session identifiers for which the client device may interact. The client device may submit 324 a selected session identifier to the server system. The client device may then receive 326 information containing links to features associated with the selected session identifier. The client device may submit 328 a link related to a desired feature and a data request to the server system. The client device may receive 330 subsequent links and any data received at the server in response to the data request. If additional data is required 332, the client device may submit 334 additional links and data requests, continuing 336 a submit and receive process.

Figure 14:
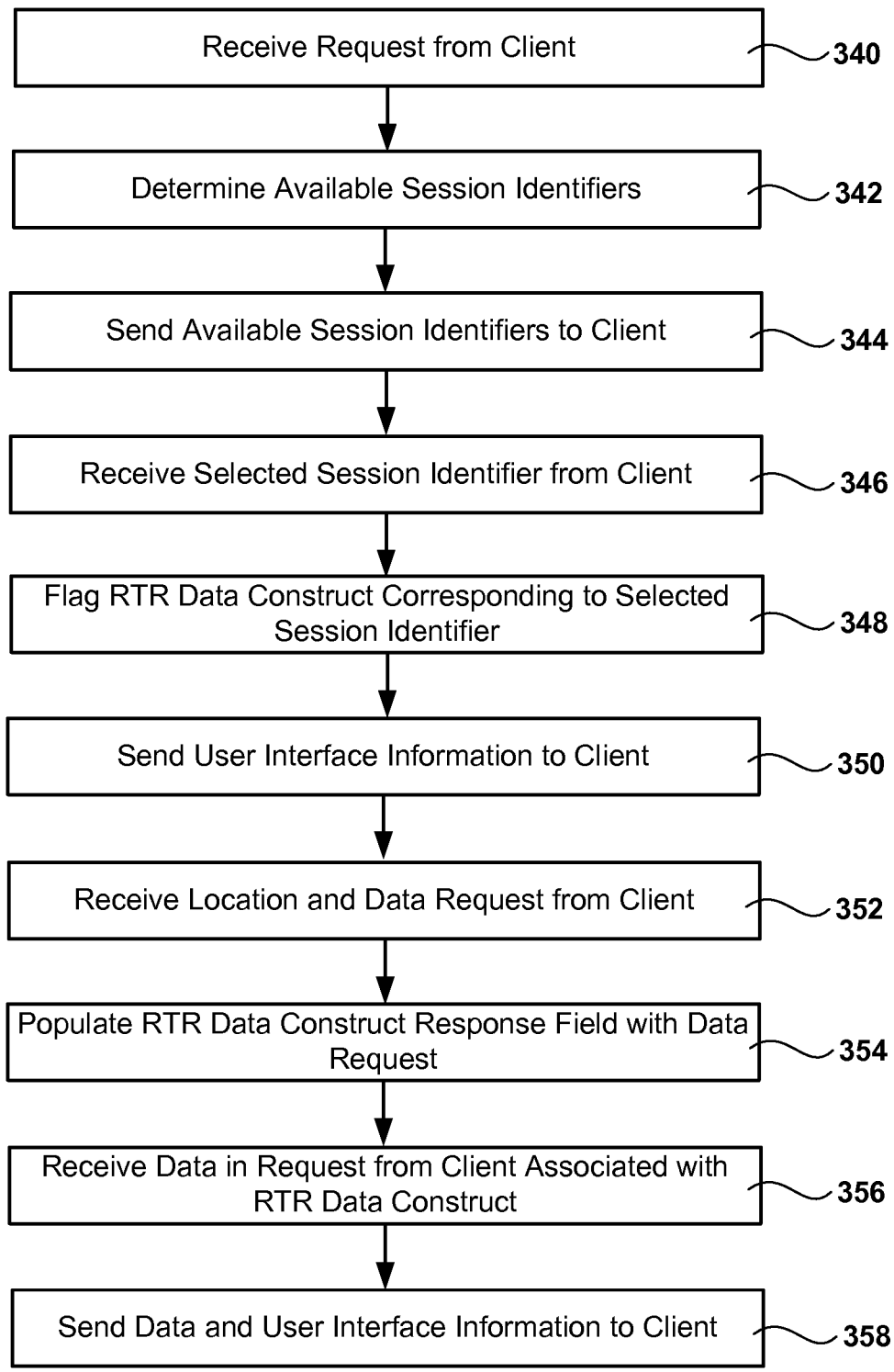
FIG. 14 is a chart showing embodiments of the present invention comprising a transaction between a server system and an electronic device.

Some embodiments of the present invention may be described in relation to FIG. 14. A server system may receive 340 a request from a client device. The server system may then determine 342 the session identifiers for available threads related to the client device request. In some embodiments, the server system may determine 342 the availability by accessing the RTR data constructs associated with connected client devices. The server system may send 344 a list of the available session identifiers to the client device from which the server system received 340 the request. The server system may then receive 346 a selected session identifier from the client device. The server system may then flag 348 the RTR data construct corresponding to the selected session identifier which may prevent other devices from attaching to the thread. The server system may then send 350 user interface information to the client device from which the request was received. The server system may then receive 352 a location for a feature selected by the client device and a data request from the client device. In some embodiments, the location may be a URL for the feature. The server system may populate 354 the response field of the RTR data construct associated with the session identifier selected by the client device with the data request. The server system may receive 356 the requested data from the client associated with the RTR data construct and may send 358 the data and additional user interface data to the client device.

In some embodiments of the present invention, the server system may create HTTP responses by utilizing "WODirectAction." "WODirectActions" may respond to stateless HTTP requests and may build HTTP responses directly by creating a "WOResponse" or by creating and returning a "WOComponent." Since the application may be stateless, the abstract class "ValidatedDirectAction," which may inherit from "WODirectAction," may be used as a base class for the various "DirectAction" classes. In some embodiments, the base URL may not contain references to the "DirectAction" or method and "WebObjects" may automatically assume "DirectAction" class and "defaultAction" method.

In some embodiments of the present invention, when an HTTP request is made, the URL may contain the "DirectAction" class name and method therein that will generate the HTTP response, except for the initial URL, which may omit these fields. When the field are omitted, by default the class "DirectAction" and method "defaultAction" may be called.

In some embodiments of the present invention, when the "DirectAction" class is loaded, the method "performActionNamed" may be called. Some embodiments may execute the method specified in the URL (or "defaultAction" if omitted). In some embodiments, "performActionNamed" may be overridden in "ValidatedDirectAction." In these embodiments, client validation may be performed first, and a concrete instance of "ValidClient" may be obtained before returning the "WOResponse" provided by the specified method. Since the class containing the method "performActionNamed" also may be the class with the method that will be called, "performActionNamed" may assign the "ValidClient" instance to a class variable that may be accessed by the method. The "ValidClient" instance also may refer to a current RTR database construct, which was obtained during authentication.

Some embodiments of the present invention comprise methods and systems for providing device-independent, autonomous features with user sessions that may be portable between devices. In some embodiments of the present invention, a user session may span multiple devices simultaneously. In alternative embodiments of the present invention, user sessions may span multiple devices in sequence.

Some embodiments of the present invention comprise methods and systems for consumer-based information within a session to flow from a first consumer device to a second consumer device without interruption in the session.

Figure 15:
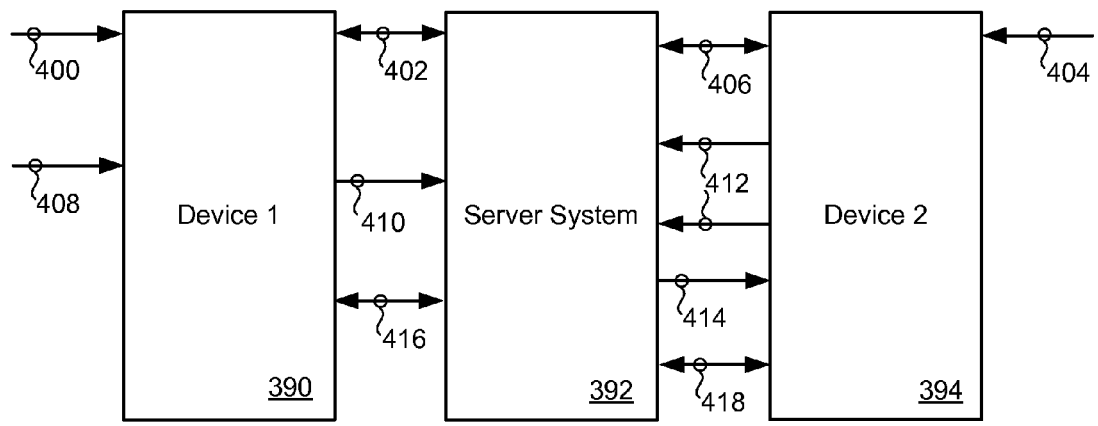
FIG. 15 is a drawing showing embodiments of the present invention comprising a first device, a second device and a server system.

Some embodiments of the present invention may be described in relation to FIG. 15. These embodiments may comprise a first device 390, a server system 392 and a second device 394. In these embodiments, a connection to the server system 392 may be initiated 400 from the first device 390. In some embodiments, a user may use a single button on the first device 390 to initiate 400 the connection. In an exemplary embodiment, the first device 390 may be a television, and connection to the server system 392 may be initiated 400 by a single-button press on the remote control associated with the television. In alternative embodiments, connection to the server system 392 may be initiated 400 when the first device 390 is powered up. In still alternative embodiments, connection to the server system 392 may be initiated 400 by a combination of button presses on the first device 390, by a menu selection from the first device 390 or other methods. The server system 392 may authenticate 402 the device 390, and once authenticated, an updated registration and discovery list of devices available to the first device 390 may be sent 402 to the first device 390. In some embodiments, the discovery list may be based on preferences set by a user. In some embodiments, the server system 392 may authenticate 402 the device 390 based on a device password. In alternative embodiments, the server system 392 may authenticate 402 the device 390 based on a user password.

A connection to the server system 392 may be initiated 404 from the second device 394. In some embodiments, a user may use a single button on the second device 394 to initiate 404 the connection. In an exemplary embodiment, the second device 394 may be a cellular telephone, and connection to the server system 392 may be initiated 404 by a single-button press on the cellular telephone. In alternative embodiments, connection to the server system 392 may be initiated 404 when the second device 394 is powered up. In still alternative embodiments, connection to the server system 392 may be initiated 404 by a combination of button presses on the second device 394, by a menu selection from the second device 394 or other methods. The server system 392 may authenticate 406 the device 394, and once authenticated, an updated registration and discovery list of devices available to the second device 394 may be sent 406 to the second device 394. In some embodiments, the discovery list may be based on preferences set by a user. In some embodiments, the server system 392 may authenticate 406 the device 394 based on a device password. In alternative embodiments, the server system 392 may authenticate 406 the device 394 based on a user password.

The first device 390 may receive 408 input which may be transferred to a device on the discovery list of the first device 390. In an exemplary embodiment, the input may be transferred to the second device 394. In some embodiments of the present invention, a user may select the recipient device for the input. In an exemplary embodiment, the user may select a pseudo name from the discovery list on the first device 390 indicating the recipient for the input. In some embodiments, if the first device 390 and the second device 394 are associated with the same user, the user may select himself as the intended recipient. In alternative embodiments of the present invention, a default recipient device may be the destination. In still alternative embodiments of the present invention, a second device 394 associated with a second user may be selected. In some embodiments of the present invention, the user may select an intended recipient by selecting a pseudo name from a buddy list on the first device 390. In some embodiments, a pseudo name from the buddy list may be associated with multiple devices. In some of these embodiments, if a pseudo name from the buddy list is associated with multiple devices, the destination(s) may be all devices associated with the pseudo name. In alternative embodiments, the destination may be a default device associated with the pseudo name. In still alternative embodiments, the destination(s) may be some of the devices associated with the pseudo name. In some embodiments, the method for determining the destination if a pseudo name is associated with multiple devices may be based on preferences defined by a user.

The first device 390 may send 410 the input and the intended destination(s) to the server system 392 as an RTR message. A second device 394 may periodically request 412 (two requests shown) messages from the server system 392. In an exemplary embodiment in which the message destination is the second device, the server system 392 may look at the RTR message sent 410 by the first device 390 and redirect 414 it to the second device 394. In some embodiments of the present invention, the server system 392 may provide the second device 394 with any transcoders, plug-ins or other required software or information necessary for control and presentation of the input sent from the first device 390. The first device 390 may wait 416 for a next request from a user and may send or receive messages to or from the second device 394. The second device 394 may wait 418 for a next request from a user and may send or receive messages to or from the first device 390.

Figure 16:
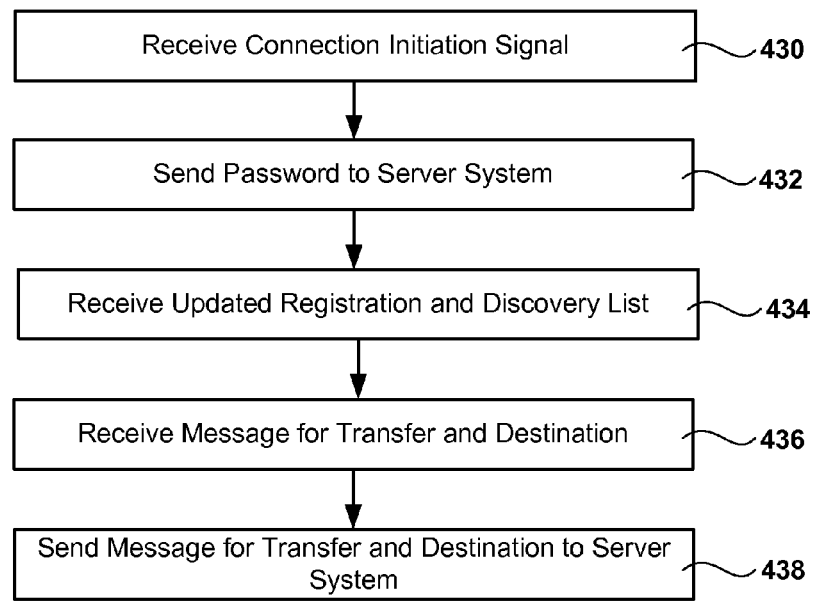
FIG. 16 is a chart showing embodiments of the present invention comprising sending a message from a first device through a server system to a second device.

Some embodiments of the present invention may be described in relation to FIG. 16. In these embodiments, a first device may receive 430 a connection initiation signal. In exemplary embodiments, the connection initiation signal may be generated in response to a single-button push, a combination of button pushes, a menu selection, powering up the device and other methods. The first device may send 432 a password to a server system. The first device may receive 434 from the server system an updated registration and discovery list. In some embodiments, the discovery list may comprise a list of pseudo names for other devices. In alternative embodiments, the discovery list may comprise a buddy list. In still alternative embodiments, the discovery list may be updated based on preferences associated with the first device or a user of the first device or other preferences. The first device may receive 436 a message and a destination indicator which may indicate a destination to which to transfer the message. In some embodiments of the present invention, the message destination may be associated with a device, or devices, on the discovery list. The first device may then send 438 the message and the destination indicator to the server system.

Figure 17:
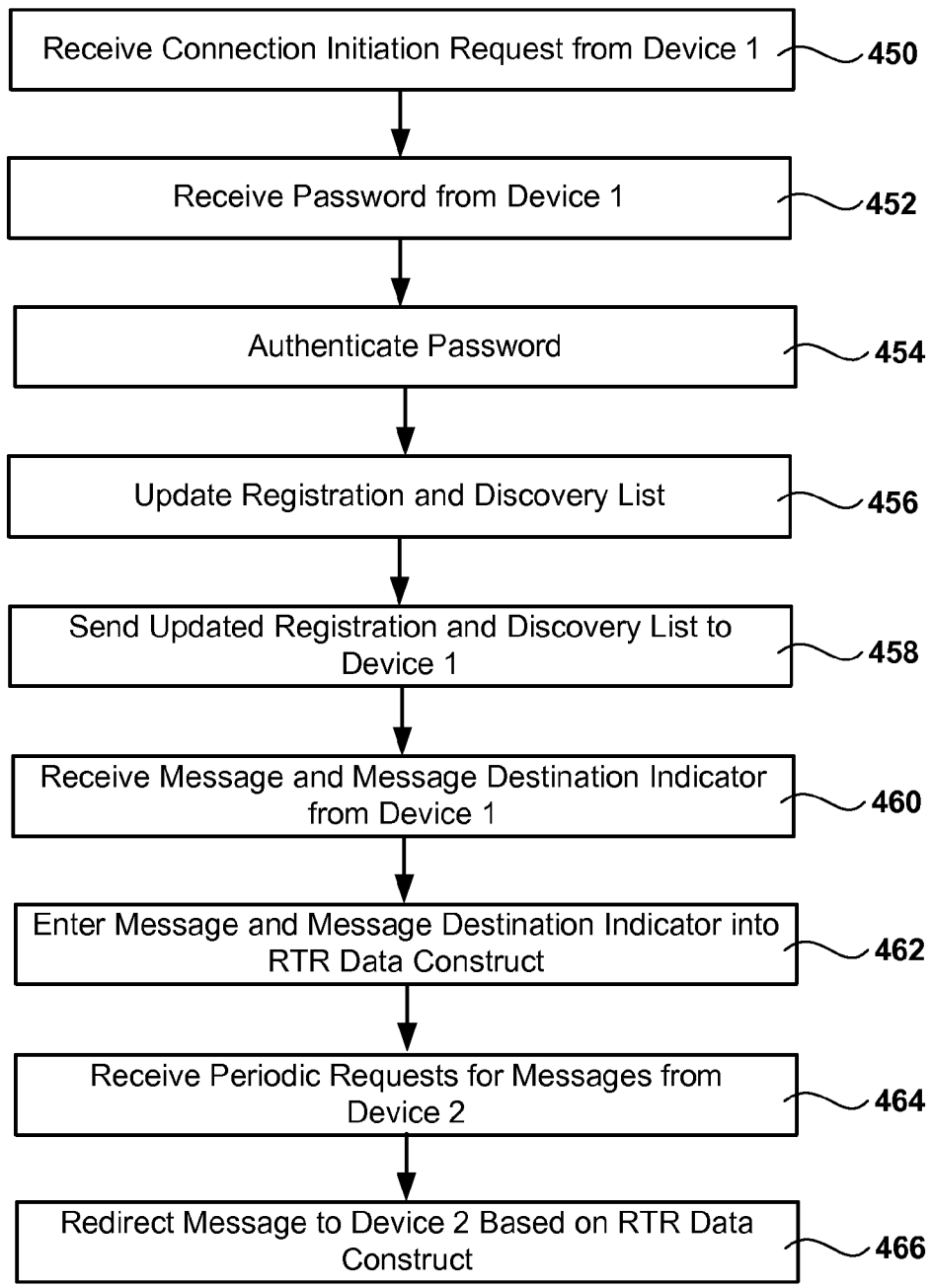
FIG. 17 is a chart showing embodiments of the present invention comprising redirecting a message from a first device to a second device through a server system using an RTR data construct.

Some embodiments of the present system may be described in relation to FIG. 17. A server system may receive 450 a connection initiation request from a first device (device 1). The server system may also receive 452 a password from the first device. In some embodiments of the present invention, the password may be a device password. In alternative embodiments, the password may be a user password. In still alternative embodiments, the password may be associated with a device and a user of the device. After receiving 452 the password from the first device, the server system may authenticate 454 the password. Upon authentication, the server system may update 456 a registration and discovery list associated with the device and/or user. The server system may send 458 the updated registration and discovery list to the first device. The server system may receive 460 a message and a message destination indicator from the first device. The server system may enter 462 the message and message destination indicator as an appropriate entry in an RTR table. The server system may also receive 464 periodic requests for messages from another, second device (device 2). When the second device is an intended recipient of the message as determined by the RTR table, the server system may redirect 466 the message to the second device.

Figure 18:
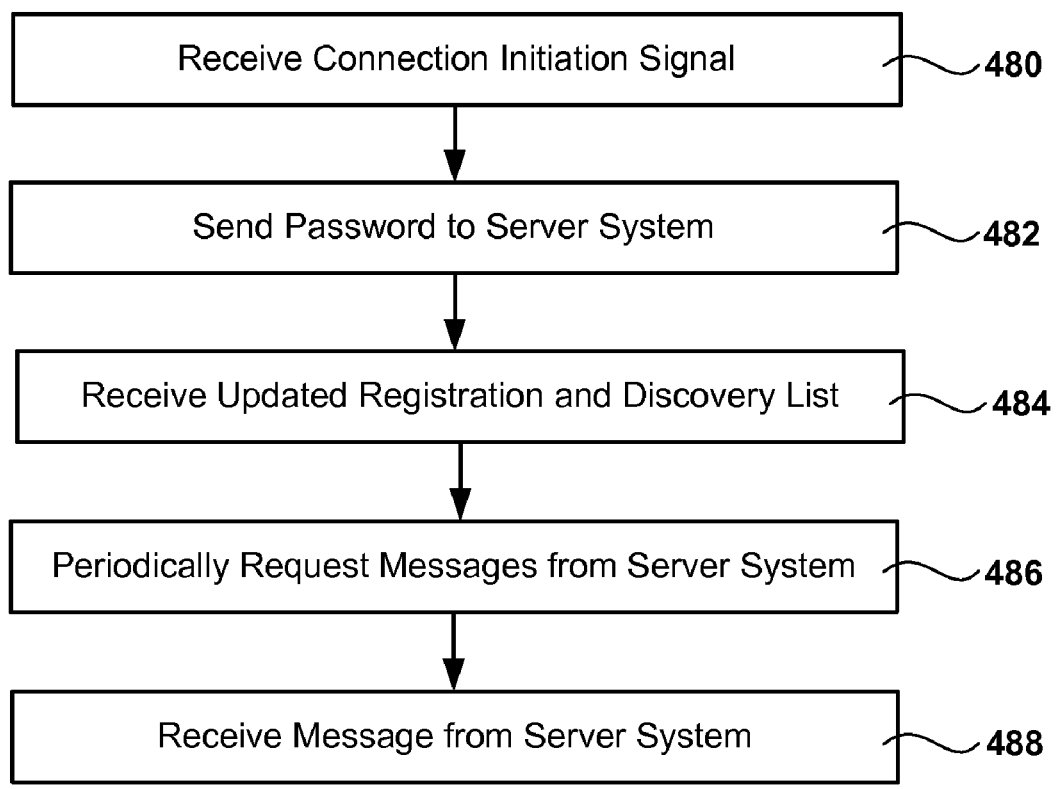
FIG. 18 is a chart showing embodiments of the present invention comprising a device polling a server system.

Some embodiments of the present invention may be described in relation to FIG. 18. A device may receive 480 a connection request signal. In exemplary embodiments, the connection initiation signal may be generated in response to a single-button push, a combination of button pushes, a menu selection, powering up the device and other methods. The device may send 482 a password to a server system. The device may receive 484 from the server system an updated registration and discovery list. In some embodiments, the discovery list may comprise a list of pseudo names for other devices. In alternative embodiments, the discovery list may comprise a buddy list. In still alternative embodiments, the discovery list may be updated based on preferences associated with the device or a user of the device or other preferences. The device may periodically poll 486 the server system for messages. The device may receive 488 a message from the server system.

In some embodiments of the present invention, the server system may maintain association between the first device and the second device through an RTR table as described above.

Figure 19:
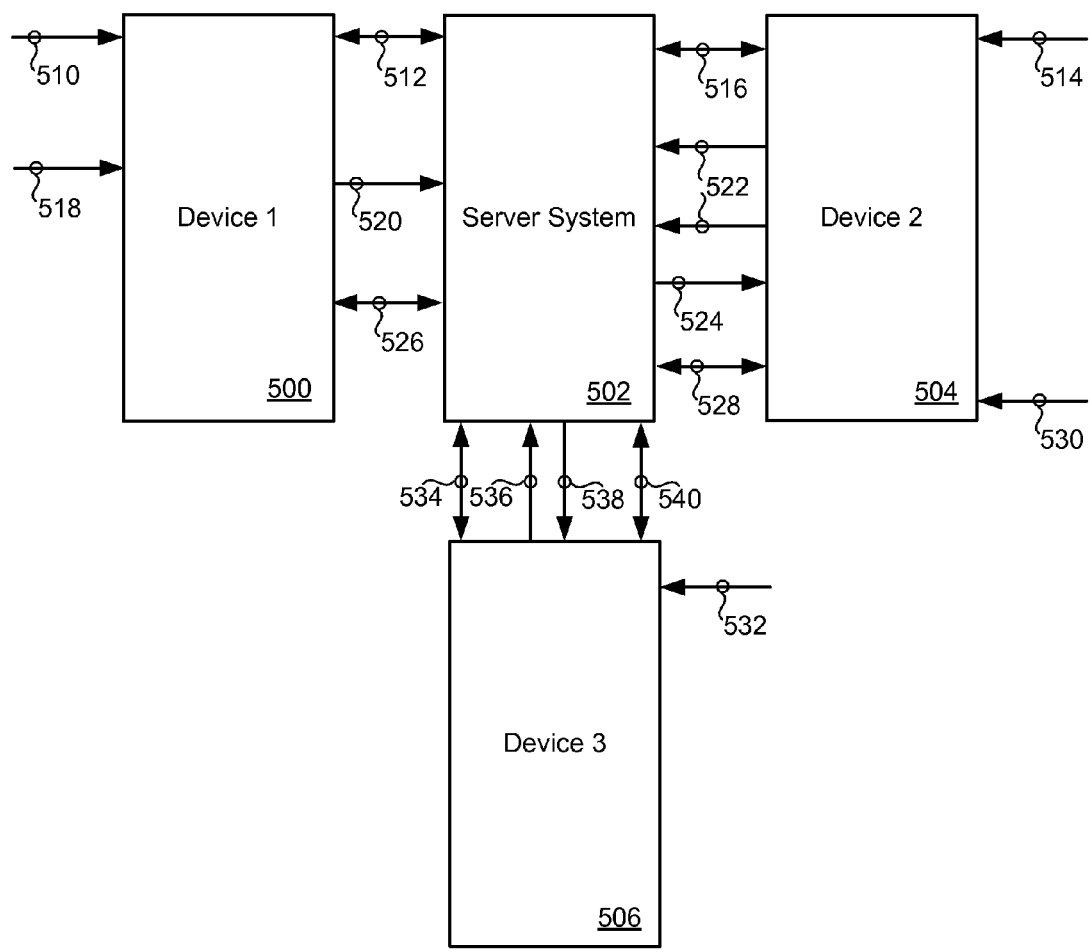
FIG. 19 is a drawing showing embodiments of the present invention comprising a plurality of devices and a server system.

Some embodiments of the present invention may be described in relation to FIG. 19. These embodiments may comprise a first device 500, a server system 502, a second device 504 and a third device 506. In these embodiments, a connection to the server system 502 may be initiated 510 from the first device 500. In some embodiments, a user may use a single button on the first device 500 to initiate 510 the connection. In an exemplary embodiment, the first device 500 may be a television, and connection to the server system 502 may be initiated 510 by a single-button press on the remote control associated with the television. In alternative embodiments, connection to the server system 502 may be initiated 510 when the first device 500 is powered up. In still alternative embodiments, connection to the server system 502 may be initiated 510 by a combination of button presses on the first device 500, by a menu selection from the first device 500 or other methods. The server system 502 may authenticate 512 the device 500, and once authenticated, an updated registration and discovery list of devices available to the first device 500 may be sent 512 to the first device 500. In some embodiments, the discovery list may be based on preferences set by a user. In some embodiments, the server system 502 may authenticate 512 the device 500 based on a device password. In alternative embodiments, the server system 502 may authenticate 512 the device 500 based on a user password.

A connection to the server system 502 may be initiated 514 from the second device 504. In some embodiments, a user may use a single button on the second device 504 to initiate 514 the connection. In an exemplary embodiment, the second device 504 may be a television, and connection to the server system 502 may be initiated 514 by a single-button press on the remote control associated with the television. In alternative embodiments, connection to the server system 502 may be initiated 514 when the second device 504 is powered up. In still alternative embodiments, connection to the server system 502 may be initiated 514 by a combination of button presses on the second device 504, by a menu selection from the second device 504 or other methods. The server system 502 may authenticate 516 the device 504, and once authenticated, an updated registration and discovery list of devices available to the second device 504 may be sent 516 to the second device 504. In some embodiments, the discovery list may be based on preferences set by a user. In some embodiments, the server system 502 may authenticate 516 the device 504 based on a device password. In alternative embodiments, the server system 502 may authenticate 516 the device 504 based on a user password.

The first device 500 may receive 518 input which may be transferred to a device on the discovery list of the first device 500. In this exemplary embodiment, the input may be transferred to the second device 504. In some embodiments of the present invention, a user may select the recipient device for the input. In some embodiments of the present invention, the user may select a pseudo name from the discovery list on the first device 500 indicating the recipient for the input. In alternative embodiments of the present invention, a default recipient device may be the destination. In some embodiments of the present invention, the user may select an intended recipient by selecting a pseudo name from a buddy list on the first device 500. In some embodiments, a pseudo name from the buddy list may be associated with multiple devices. In some of these embodiments, if a pseudo name from the buddy list is associated with multiple devices, the destination(s) may be all devices associated with the pseudo name. In alternative embodiments, the destination may be a default device associated with the pseudo name. In still alternative embodiments, the destination(s) may be some of the devices associated with the pseudo name. In some embodiments, the method for determining the destination if a pseudo name is associated with multiple devices may be based on preferences defined by a user.

The first device 500 may send 520 the input and the intended destination(s) to the server system 502 as an RTR message. A second device 504 may periodically request 522 (two requests shown) messages from the server system 502. In this exemplary embodiment in which the message destination is the second device, the server system 502 may look at the RTR message sent 520 by the first device 500 and redirect 524 it to the second device 504. In some embodiments of the present invention, the server system 502 may provide the second device 504 with any transcoders, plug-ins or other required software or information necessary for control and presentation of the input sent from the first device 500. The first device 500 may wait 526 for a next request from a user and may send or receive messages to or from the second device 504. The second device 504 may wait 528 for a next request from a user and may send or receive messages to or from the first device 500.

A device may be disconnected from the current session. For example, the second device 504 may be powered down 530, thereby disconnecting the current session from the server system 502. When the user may initiate 532 a connection request through a third device 506, the server system 502 may authenticate 534 the user with his password. Once authenticated, the registration and discovery list for the third device 506 may be updated 534. The third device 506 may periodically poll (one shown) 536 the server system 502 for messages. The server system 502 may associate the user on the third device 506 with the session from the second device 504 through the RTR mechanism, and the session may continue using the third device 506 and the first device 500. The server system 502 may deliver a message 538 to the third device 506. The server system 502 may also provide the third device 506 with any transcoders, plug-ins or other requirements for control and presentation of the delivered message. The third device 506 may wait 540 for a next request from a user and may send or receive messages to or from the first device 500.

Some embodiments of the present invention described herein provide session synchronization between multiple devices through the creation of a database construct (e.g., an RTR table) which stores self-contained requests for all devices and applications. Entries in the database construct may be based on synchronized response trips for communicating devices, thereby providing device independence allowing user sessions that may span multiple devices at the same time or in sequence.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for managing communication between a first device and a second device, said method comprising:
    establishing a first connection between a server system and a first device;
    establishing a second connection between said server system and a second device;
    establishing, on said server system, a real-time-request (RTR) database construct and RTR management logic linking said first device and said second device, wherein said RTR database construct comprises a linked list of database entries wherein each entry represents a step in a storyline for said first device and wherein said database entries comprise data fields to accommodate single and multiple client storylines step-synchronized between clients;
    receiving at said server system a first request from said first device, wherein said first request comprises a base location identifier associated with said server system;
    creating a first entry in said RTR database construct using said RTR management logic, said first entry comprising an entry identifier (ID) and a session identifier (SessionID);
    populating an HTTP response field in said first entry, with said RTR management logic, said HTTP response field comprising a next URL identifier and said SessionID;
    receiving at said server system a first destination indicator associated with said first message; and
    sending said first message to said second device using said database construct and said next URL when said first destination indicator indicates said second device is an intended recipient of said first message, thereby synchronizing communication between said first device and said second device.

2. A method according to claim 1, wherein said first destination indicator further indicates a plurality of devices associated with a single user.

3. A method according to claim 2, wherein:
    each of said plurality of devices is linked to said first device through said database construct; and
    said first message is sent to each of said plurality of devices using said database construct.

4. A method according to claim 1, wherein said database construct persists when said first connection or said second connection is broken.

5. A method according to claim 1, wherein said establishing said first connection occurs in response to one of the group consisting of powering up of said first device, a single-button push on said first device, a multiple-button push on said first device and a menu selection on said first device.

6. A method according to claim 1, wherein said establishing said second connection occurs in response to one of the group consisting of powering up of said second device, a single-button push on said second device, a multiple-button push on said second device and a menu selection on said second device.

7. A method according to claim 1, wherein said establishing said first connection comprises:
    receiving a first password from said first device at said server system, wherein said first password is associated with a first user;
    authenticating said first user using said first password; and
    sending a first discovery list to said first device when said authenticating said first user is successful.

8. A method according to claim 1, wherein said establishing said second connection comprises:
    receiving a second password from said second device at said server system, wherein said second password is associated with a second user;
    authenticating said second user using said second password; and
    sending a second discovery list to said second device when said authenticating said second user is successful.

9. A method according to claim 1, wherein said establishing said database construct comprises:
    receiving, at said server system, a first request from said first device;
    entering said first request in said database construct, thereby producing a first entry in said database construct;
    associating a first session identifier with said first entry;
    associating a first entry identifier with said first entry;
    receiving, at said server system, a first response from said second device, wherein said first response comprises a location identifier; and
    entering said first response in said database construct.

10. A method according to claim 9, wherein said first response comprises a poll for a message.

11. A method according to claim 9, wherein said location identifier is a URL.

12. A method according to claim 9, wherein said first request comprises first-device credentials for said first device.

13. A method according to claim 9, wherein said first response comprises second-device credentials for said second device.

14. A method according to claim 9, wherein said first response and said first request are linked by said first entry identifier.

15. A system for managing communication between a first device and a second device, said system comprising:
    a first connection-request receiver for receiving a connection request from a first device;
    a first authenticator for authenticating said first device;
    a second connection-request receiver for receiving a connection request from a second device;
    a second authenticator for authenticating said second device;
    a real-time-request (RTR) database construct and RTR management logic, wherein said first device and said second device are linked, wherein said RTR database construct comprises a linked list of database entries wherein each entry represents a step in a storyline for said first device or said second device and wherein said database entries comprise data fields to accommodate single and multiple client storylines step-synchronized between clients;
    a message receiver for receiving a first message from said first device;
    a destination-indicator receiver for receiving a first destination indicator associated with said first message, wherein said first destination indicator indicates said second device is an intended recipient for said first message, thereby synchronizing communication between said first device and said second device; and a transmitter for sending said first message to said second device using said database construct.

16. A system according to claim 15, wherein said database construct persists when said first connection or said second connection is broken.

17. A system according to claim 15, said system further comprising:
   a first updater for updating a first discovery list associated with said first device; and
   a second updater for updating a second discovery list associated with said second device.

18. A system according to claim 15, said system further comprising:
   a request receiver for receiving a first request from said first device;
   a response receiver for receiving a first response from said second device, wherein said first response comprises a location identifier and said first response is associated with said first request;
   a first recorder for entering said first request in said database construct, thereby producing a first entry;
   a session associator for associating a first session identifier with said first entry;
   an entry associator for associating a first entry identifier with said first entry;
   a second recorder for entering said first response in said database construct, thereby producing a second entry;
   a response transmitter for sending said first response to said first device; and
   a location-identified receiver for receiving, at said location identifier, a second request from said first device.

19. A system according to claim 18, wherein said first response comprises a poll for a message.

20. A system according to claim 18, wherein said location identifier is a URL.

* * * * *